US012455797B2

(12) United States Patent
Ichikawa et al.

(10) Patent No.: US 12,455,797 B2
(45) Date of Patent: Oct. 28, 2025

(54) COPY EXECUTION TIME OPTIMIZATION SYSTEM MANAGEMENT

(71) Applicant: Hitachi Vantara, Ltd., Yokohama (JP)

(72) Inventors: Noriko Ichikawa, Tokyo (JP); Jun Nakajima, Tokyo (JP)

(73) Assignee: HITACHI VANTARA, LTD., Kanagawa-Ken (JP)

( * ) Notice: Subject to any disclaimer, the term of this patent is extended or adjusted under 35 U.S.C. 154(b) by 0 days.

(21) Appl. No.: 18/825,665

(22) Filed: Sep. 5, 2024

(65) Prior Publication Data
US 2025/0147850 A1 May 8, 2025

(30) Foreign Application Priority Data
Nov. 6, 2023 (JP) ................................. 2023-189628

(51) Int. Cl.
*G06F 11/14* (2006.01)
(52) U.S. Cl.
CPC ...... *G06F 11/1469* (2013.01); *G06F 11/1464* (2013.01); *G06F 2201/80* (2013.01)
(58) Field of Classification Search
None
See application file for complete search history.

(56) References Cited

U.S. PATENT DOCUMENTS

| 2009/0049328 | A1  | 2/2009  | Hattori et al. |
| 2010/0274767 | A1* | 10/2010 | Irisawa ............... G06F 11/1456 707/654 |
| 2010/0299309 | A1* | 11/2010 | Maki ................... G06F 11/1479 718/1 |
| 2013/0006941 | A1* | 1/2013  | Asakura ............. G06F 11/1471 707/648 |
| 2024/0427733 | A1* | 12/2024 | Shrivastava .......... G06F 16/128 |

FOREIGN PATENT DOCUMENTS

JP      2009-020568 A      1/2009

* cited by examiner

*Primary Examiner* — Eddy Cheung
(74) *Attorney, Agent, or Firm* — Volpe Koenig

(57) ABSTRACT

A system managing apparatus decides a time optimum for executing data copying from a copy source volume to a copy destination volume, and manages an RPO requirement of a user and a quiescing time period for each application at the time of a copy start. The system managing apparatus calculates a copy execution time and a copy execution interval such that data in which application consistency is maintained can be acquired at an interval that satisfies the RPO. In addition, the system managing apparatus monitors the use status of an application and the use status of a copy line after the start of copy operation, and calculates a copy execution time and a copy execution interval that allow a return to an appropriate recovery point, taking into consideration an application quiescing time period and a period of time required for copy completion that change in real time.

20 Claims, 13 Drawing Sheets

FIG.5

| USER NAMES | APPLICATION NAMES | VOLUME IDs | AMOUNTS OF DATA (GB) | COPY REQUIREMENTS ||||
|---|---|---|---|---|---|---|---|
| | | | | RTO | RPO | NOs. OF GENERATIONS TO BE STORED | COPY DESTINATION CLOUDS |
| userA | App1 | VOL1 | 800 | 5min | 5min | 3 | CLOUD 1 |
| userB | App2 | VOL2 | 1200 | 1day | 1h | 3 | CLOUD 2 |
| userC | App3 | VOL3 | 500 | 15min | 10min | 3 | CLOUD NOT USED |

FIG.6

| APPLICATION NAMES | VOLUME IDs | QUIESCING TIME PERIOD PER UNIT DATA AMOUNT [min/TB] |
|---|---|---|
| App1 | VOL1 | 0.5 |
| App2 | VOL2 | 1 |
| App3 | VOL3 | 2 |
| App4 | VOL4 | 2 |

FIG.7

| MANAGEMENT SOFTWARE NAMES | SUPPORTED APPLICATION NAMES |
|---|---|
| STORAGE MANAGEMENT SOFTWARE 1 | App1, App3 |
| STORAGE MANAGEMENT SOFTWARE 2 | App4 |

| APPLICATION NAMES | COPY PROCEDURES |
|---|---|
| App1 | 1. App1 QUIESCING COMMAND a<br>2. App1 QUIESCING COMMAND b<br>3. App1 QUIESCING COMMAND c<br>4. "COPY COMMAND"<br>5. App1 QUIESCING CANCELLATION COMMAND d<br>6. App1 QUIESCING CANCELLATION COMMAND e<br>7. App1 QUIESCING CANCELLATION COMMAND f |
| App2 | 1. App2 QUIESCING COMMAND aa<br>2. App2 QUIESCING COMMAND bb<br>3. App2 QUIESCING COMMAND cc<br>4. "COPY COMMAND"<br>5. App2 QUIESCING CANCELLATION COMMAND dd<br>6. App2 QUIESCING CANCELLATION COMMAND ee<br>7. App2 QUIESCING CANCELLATION COMMAND ff |

| COPY PAIR IDs | JOB IDs | TRANSFER DATA AMOUNTS | COPY TIME PERIODS | | |
|---|---|---|---|---|---|
| | | | COPY EXECUTION INSTRUCTION TIMES | COPY COMPLETION TIMES | COPY REQUIRED TIME PERIODS |
| 1 | 10001 | 50GB | Aug.2 10:00 | Aug.2 10:01 | 1min |
| | 10011 | 50GB | Aug.2 10:05 | Aug.2 10:07 | 2min |
| | 10022 | 100GB | Aug.2 10:10 | Aug.2 10:13 | 3min |
| 2 | 20001 | 50GB | Aug.2 10:00 | Aug.2 10:05 | 5min |
| | 20012 | 100GB | Aug.3 11:00 | Aug.2 11:06 | 6min |

| COPY PAIR IDs | NETWORK LINE NAMES | TIMES | BANDS | USE RATES |
|---|---|---|---|---|
| 1 | COMPANY A, NETWORK LINE A | Aug.2 10:00 | 800Mbps | 50% |
| 2 | COMPANY A, NETWORK LINE B | Aug.2 10:00 | 20Gbps | 40% |
| 3 | COMPANY B, NETWORK LINE C | Aug.2 10:00 | 1Gbps | 20% |

| COPY PAIR IDs | PERIODIC EXECUTION | IMPLEMENTATION TIMINGS | NOs. OF GENERATIONS OF SNAPSHOTS TO BE STORED |
|---|---|---|---|
| 1 | ON | AT INTERVALS OF 5 MINUTES | 5 |
| 2 | OFF | 23/09/28 06:12 | 3 |
| 3 | ON | 06:00、12:00 | 1 |

| COPY PAIR IDs | APPLICATION NAMES | COPY METHOD NAMES | COPY SOURCES | | COPY DESTINATIONS | |
|---|---|---|---|---|---|---|
| | | | SITE NAMES | VOLUME IDs | SITE NAMES | VOLUME IDs |
| 1 | App1 | REMOTE COPY 1 | DC1 | VOL1 | CLOUD 1 | VOL4 |
| 2 | App2 | LOCAL COPY 2 | DC1 | VOL2 | CLOUD 1 | VOL5 |
| 3 | App3 | REMOTE COPY 1 | DC1 | VOL3 | CLOUD 1 | VOL6 |

| COPY METHOD NAMES | COPY PROCEDURES |
|---|---|
| REMOTE COPY 1 | 1.PAIR<br>2.PSUS |
| LOCAL COPY 1 | 1. COPY |

■ INPUT SCREEN (REQUIREMENT INPUT)

■ COPY ENVIRONMENT DECISION ASSISTANCE TOOL

- VOLUME NAME
- APPLICATION NAME
- RPO
- RTO
- COPY DESTINATION CLOUD
- NO. OF DESIRED RETURN TIME POINTS

OK

■ OUTPUT SCREEN (COPY PROCEDURE OUTPUT SCREEN)

COPY IS TO BE ACQUIRED IN CLOUD 1.
COPY OF APPLICATION BEING USED CAN BE ACQUIRED BY THE FOLLOWING PROCEDURE. RECOMMENDED COPY ACQUISITION INTERVAL IS FIVE MINUTES.
PLEASE IMPLEMENT AS YOUR SCHEDULE ALLOWS.

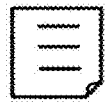

COPY PROCEDURE

COPY EXECUTION TIME OPTIMIZATION SYSTEM MANAGEMENT

BACKGROUND OF THE INVENTION

1. Field of the Invention

The present invention relates to a system managing apparatus and a system management method. Specifically, the present invention relates to a system managing apparatus and a system management method that assist optimum copy method decision taking into consideration even application requirements of a user when copying is implemented in a hybrid cloud environment where on-premises storage resources and cloud storage resources are managed centrally.

2. Description of the Related Art

There are an increasing number of cases where a customer places copy data in the cloud in order to reduce costs when the customer introduces backups or disaster recovery (DR). In addition, storage resources of a hybrid cloud service are provided as virtual volumes, and an application developer uses the storage resources from a host computer for an application development use. Accordingly, when a copy of the virtual volumes is to be acquired, an optimum copy configuration and copy method that satisfy an application-level recovery point objective (RPO) and recovery time objective (RTO) need to be determined.

In a technology (hereinafter, called a "conventional technology") described in JP-2009-020568-A, regarding remote copy configurations in which a copy source storage and a copy destination storage are at remote locations, a copy configuration satisfying an RPO and an RTO of a user and a recovery procedure are presented.

SUMMARY OF THE INVENTION

The scheme of the conventional technology mentioned above discloses a method of deciding a copy configuration, a copy procedure, and a restoration procedure that guarantee a storage-block-level RPO and RTO. Here, in order to satisfy an application-level RPO, it is necessary to acquire a copy of data of a desired recovery time point in which the consistency of an application is maintained. In order to realize this, it is necessary to temporarily quiesce an application at a desired recovery time point, write entire data having been written on a memory (e.g., a cache memory included in a host computer) until that time point on a non-transitory storage medium (e.g., a hard disk drive (HDD)) of a storage, and then acquire a copy of volumes used as a non-transitory storage medium. However, in the conventional technology, no further processing is performed but simply a copy of volumes is acquired at intervals designated by the RPO, and accordingly, the RPO and RTO defined here are not sufficient for guaranteeing the consistency of the application in copy data.

In addition, in a hybrid cloud configuration, there are also many cases where a network line connecting an on-premise and a public cloud is not a dedicated line, a period of time required for completion of copying differs depending on the amount of data to be transferred, and a temporal difference from a copy execution time managed by a user or a system is generated. As a result, there is a possibility that data of a recovery time point desired by the user has not successfully been acquired, but the existing technology does not take the possibility into consideration.

The present invention has been made to solve the problems described above. That is, one of objects of the present invention is to provide a system managing apparatus and a system management method that make it possible to assist copy operation satisfying application-level copy requirements.

In order to solve the problems described above, a system managing apparatus of the present invention is a system managing apparatus including an information processing apparatus that manages a hybrid cloud system that includes a computer system including a first storage constructed in an on-premises environment and a second storage constructed in a cloud environment, the hybrid cloud system being configured to enable data copying by which a copy of data of an application stored on the first storage is stored on the second storage. The information processing apparatus is configured to acquire a recovery point objective, an application quiescing time period per unit data amount, a copy data amount, and a copy time period regarding the data copying of the application, and calculate a timing of a copy execution instruction for the data copying that guarantees the recovery point objective that maintains consistency of the application, on the basis of the recovery point objective, the application quiescing time period per unit data amount, the copy data amount, and the copy time period.

A system management method of the present invention is a system management method using an information processing apparatus that manages a hybrid cloud system that includes a computer system including a first storage constructed in an on-premises environment and a second storage constructed in a cloud environment, the hybrid cloud system being configured to enable data copying by which a copy of data of an application stored on the first storage is stored on the second storage. The system management method includes, by the information processing apparatus, acquiring a recovery point objective, an application quiescing time period per unit data amount, a copy data amount, and a copy time period regarding the data copying of the application, and, by the information processing apparatus, calculating a timing of a copy execution instruction for the data copying that guarantees the recovery point objective that maintains consistency of the application, on the basis of the recovery point objective, the application quiescing time period per unit data amount, the copy data amount, and the copy time period.

According to representative modes of the present invention, it is possible to assist copy operation satisfying application-level copy requirements. Problems, configurations, and advantages other than those mentioned before are made clear by the following explanation of an embodiment. Note that the advantages described here are not necessarily the sole advantages, and there may be any advantages described in the present disclosure.

BRIEF DESCRIPTION OF THE DRAWINGS

FIG. 5 is a figure depicting an example of user requirement management information;

FIG. 6 is a figure depicting an example of application quiescing time period management information;

FIG. 7 is a figure depicting an example of application support information;

FIG. 8 is a figure depicting an example of copy procedure management information;

FIG. 9A is a figure depicting copy required time period management information;

FIG. 9B is a figure depicting an example of a data configuration of network line use statuses;

FIG. 10 is a figure depicting an example of copy schedule management information;

FIG. 11 is a figure depicting an example of copy configuration information;

FIG. 12 is a figure depicting an example of copy execution command information;

FIG. 16 is a figure depicting an example of output display of a service portal screen.

DESCRIPTION OF THE PREFERRED EMBODIMENT

Hereinbelow, an embodiment of the present invention is explained using the figures. It should be noted that the present invention is not to be interpreted as being limited to description details of the embodiment depicted below. Those skilled in the art easily understand that specific configurations of the present invention can be changed within the scope not departing from the idea or aim of the present invention.

In the configuration of the invention explained below, identical or similar constituent elements or functions are given identical reference symbols, and overlapping explanations are omitted.

The use of words such as "first," "second," or "third" in the present specification and the like is for the purpose of identifying each constituent element and does not necessarily limit the numbers or orders thereof.

Whereas an example of various types of information is explained using an expression "XX table" in the present specification and the like in some cases, an example of the various types of information may be expressed as a data structure such as an "XX list" or an "XX queue." In addition, an "XX table" may be referred to as "XX information." Expressions such as "identification information," "identifier," "name," "ID," or "numeral" are used when identification information is explained, and these are interchangeable.

<System Configuration>

Figure 1:
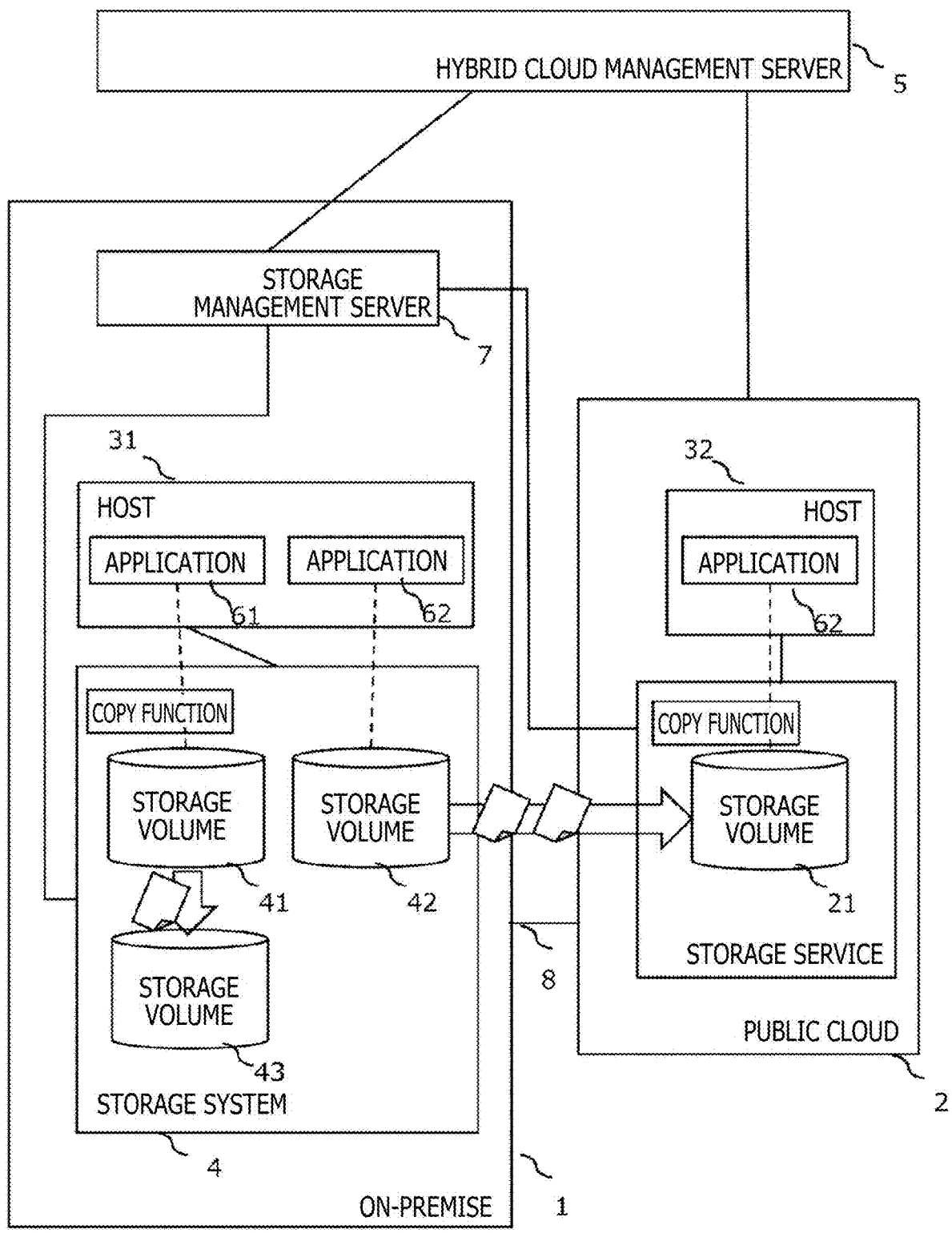
FIG. 1 is a figure depicting an example of a hybrid cloud system configuration.

FIG. 1 is a block diagram depicting a system configuration example of a hybrid cloud system. The hybrid cloud system is a system that copies data from a storage system 4 of an on-premise 1 to a public cloud 2 via a network 8 such as the Internet, a local area network (LAN), or a wide area network (WAN).

The on-premise 1 includes a computer system having the storage system 4 constructed in an on-premises environment, a storage management server 7 responsible for management of storage resources, and a host 31. The storage system 4 has a storage volume 41 and a storage volume 42. The storage volume 41 and the storage volume 42 are provided to the host 31. Note that, for convenience, the storage system 4 constructed in the on-premises environment is called a "first storage" in some cases.

The storage system 4 of the on-premise 1 and the public cloud 2 also are connected to each other for communication via the network 8. Note that a communication speed ([bps]) is set for communication between the storage system 4 of the on-premise 1 and the public cloud 2 depending on its bandwidth.

A hybrid cloud management server 5 comprehensively manages an apparatus of the on-premise 1 and resources of the public cloud 2, and software as a service (Saas) is provided to an administrator of the host 31. The hybrid cloud management server 5 has a service portal 5020 (refer to FIG. 2) and provides a service to the administrator of the host 31 through the service portal 5020. Specifically, for example, the service portal 5020 makes storage volumes visible as virtualized volumes. In addition, a copy of the virtualized volumes can also be acquired through the service portal 5020. Note that, for convenience, the hybrid cloud management server 5 is called a "system managing apparatus" in some cases.

The host 31 can use virtualized volumes as a drive of a computer, and executes an application 61, stores data generated in the application 61 on a virtual storage volume, and so on. In addition, the host 31 can also acquire a copy of data stored in virtual volumes.

Storage services of the public cloud 2 include an object storage service and a block storage service, and the public cloud 2 provides storage instances of those services as virtual storage volumes to the service portal 5020. In addition, the public cloud 2 also provides a server instance 32 having a processor and a memory. Note that the storage services of the public cloud 2 provide storages constructed in a cloud environment, and, for convenience, the storages provided by the storage services are also called "second storages."

In the hybrid cloud system, the hybrid cloud management server 5 copies data stored in the storage volume 41 and the storage volume 42 to the public cloud 2, recovers, in the storage system 4, data copied to the public cloud 2, and so on.

The copying and the recovery are executed by the hybrid cloud management server 5 issuing a copy instruction or a recovery instruction to a copy function of the storage system 4 through the storage management server 7. As a copy configuration, data is copied from the storage volume 41 to a storage volume 43 in the storage system 4 in some cases, or data is copied from the storage volume 42 of the storage system 4 of the on-premise 1 to a storage volume 21 provided by a storage service of the public cloud 2 in some cases. In a DR configuration prepared for a site failure of the on-premise 1, not only for the storage volume 21, but also for a host 32, data is replicated in the public cloud 2 for business continuity by using a server instance service of the public cloud 2.

<Hardware Configuration>

Figure 2:
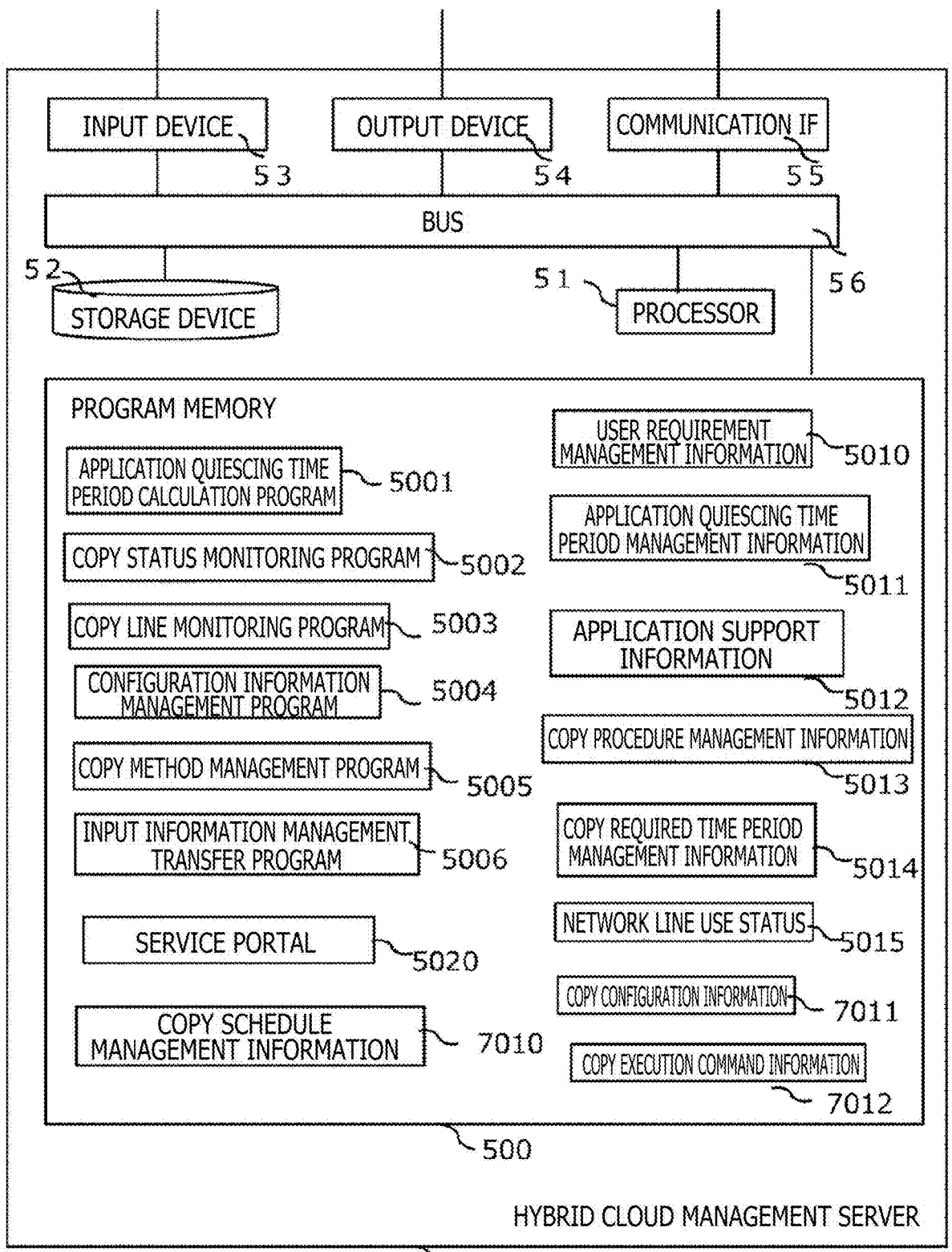
FIG. 2 is a figure depicting an example of a configuration of a hybrid cloud management server.

FIG. 2 is a block diagram depicting a hardware configuration example of the hybrid cloud management server 5. The hybrid cloud management server 5 has a processor 51, a storage device 52, a program memory 500, an input device 53, an output device 54, and a communication interface (communication IF) 55. Note that an apparatus having the processor 51, the storage device 52, the program memory 500, the input device 53, the output device 54, the communication IF 55, and a bus 56 is also called an "information processing apparatus" in some cases. The information processing apparatus may be a virtual information processing apparatus constructed on a plurality of information processing apparatuses or the cloud. The processor 51, the storage device 52, the program memory 500, the input device 53, the output device 54, and the communication IF 55 are connected to one another by the bus 56. The processor 51 controls the hybrid cloud management server 5. Data is input on the input device 53. For example, the input device 53 includes a keyboard, a mouse, a touch panel, a numeric keypad, a scanner, a microphone, and a sensor. Data is output on the output device 54. For example, the output device 54 includes a display (display apparatus), a printer, and a speaker. The communication IF 55 is connected with a network and transmits and receives data. The storage device 52 is a storage medium that stores data transitorily or non-transitorily, and includes, for example, a read only memory (ROM), a random access memory (RAM), an HDD, and a solid state drive (SSD). An application quiescing time period calculation program 5001, a copy status monitoring program 5002, a copy line monitoring program 5003, a configuration information management program 5004, a copy method management program 5005, and an input information management transfer program 5006 are installed on the program memory 500. The application quiescing time period calculation program 5001 is a program that monitors a period of time required for writing, in a non-transitory storage medium (e.g., an HDD) included in the storage system 4, data related to an application stored on a transitory storage medium (e.g., a cache memory included in the host 31), for each application 61 at the host 31 using the storage volume 41, and that calculates a period of time required for application quiescing per unit data amount. The copy status monitoring program 5002 is a program that manages the copy progress status of a copy job for which a copy execution command has been issued. The copy line monitoring program 5003 is a program that monitors the status of the network 8 between the on-premise 1 and the public cloud 2. The configuration information management program 5004 is a program that periodically receives copy configuration information 7011 and copy execution command information 7012 from the storage management server 7. The copy method management program 5005 is a program that decides a copy configuration, a copy execution time, and a copy procedure for user requirements. The input information management transfer program 5006 is a program that manages information input by a user and that gives the storage management server 7 an instruction for execution of a relevant operation when there is a request from a user for an operation on the storage system 4. The service portal 5020 is a screen serving as an interface to be used when a user uses a hybrid cloud service, and the user makes requests for data copying or recovery through the screen. In addition, the program memory 500 has stored thereon user requirement management information 5010, application quiescing time period management information 5011, application support information 5012, copy procedure management information 5013, copy required time period management information 5014, network line use statuses 5015, the copy configuration information 7011, and the copy execution command information 7012. Details of the configuration information are mentioned later.

Figure 3:
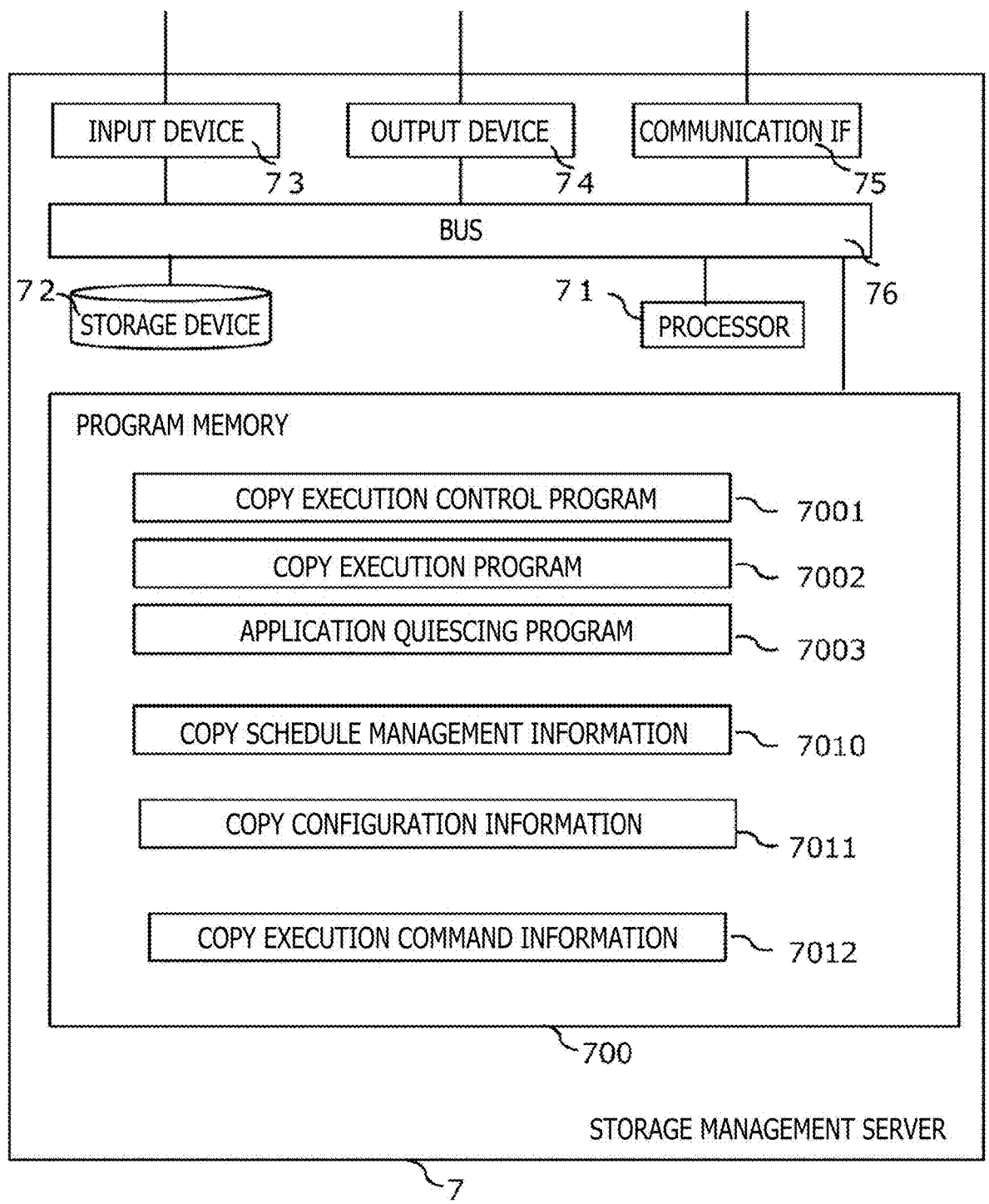
FIG. 3 is a figure depicting an example of a configuration of a storage management server.

FIG. 3 is a block diagram depicting a hardware configuration example of the storage management server 7. The storage management server 7 has a processor 71, a storage device 72, a program memory 700, an input device 73, an output device 74, and a communication IF 75. The processor 71, the storage device 72, the program memory 700, the input device 73, the output device 74, and the communication IF 75 are connected to one another by a bus 76. The processor 71 controls the storage management server 7. Data is input on the input device 73. For example, the input device 73 includes a keyboard, a mouse, a touch panel, a numeric keypad, a scanner, a microphone, and a sensor. Data is output on the output device 74. For example, the output device 74 includes a display (display apparatus), a printer, and a speaker. The communication IF 75 is connected with a network and transmits and receives data. The storage device 72 is a storage medium that stores data transitorily or non-transitorily, and includes, for example, a ROM, a RAM, an HDD, and an SSD. A copy execution control program 7001, a copy execution program 7002, and an application quiescing program 7003 are installed on the program memory 700. The copy execution control program 7001 is a program that transmits a copy instruction to the copy execution program 7002 on the basis of copy schedule management information 7010. The copy execution control program 7001 may directly transmit an instruction to the copy function implemented in the storage system 4. The copy execution program 7002 is a program that executes copying when an instruction from the copy execution control program 7001 is received. The application quiescing program 7003 is a program that gives a host computer 31 (also called the "host 31" in some cases) having stored thereon a copy target application an instruction for quiescing data of the copy target application 61. In addition, the program memory 700 has stored thereon the copy schedule management information 7010, the copy configuration information 7011, and the copy execution command information 7012. Details of the configuration information are mentioned later.

Figure 4:
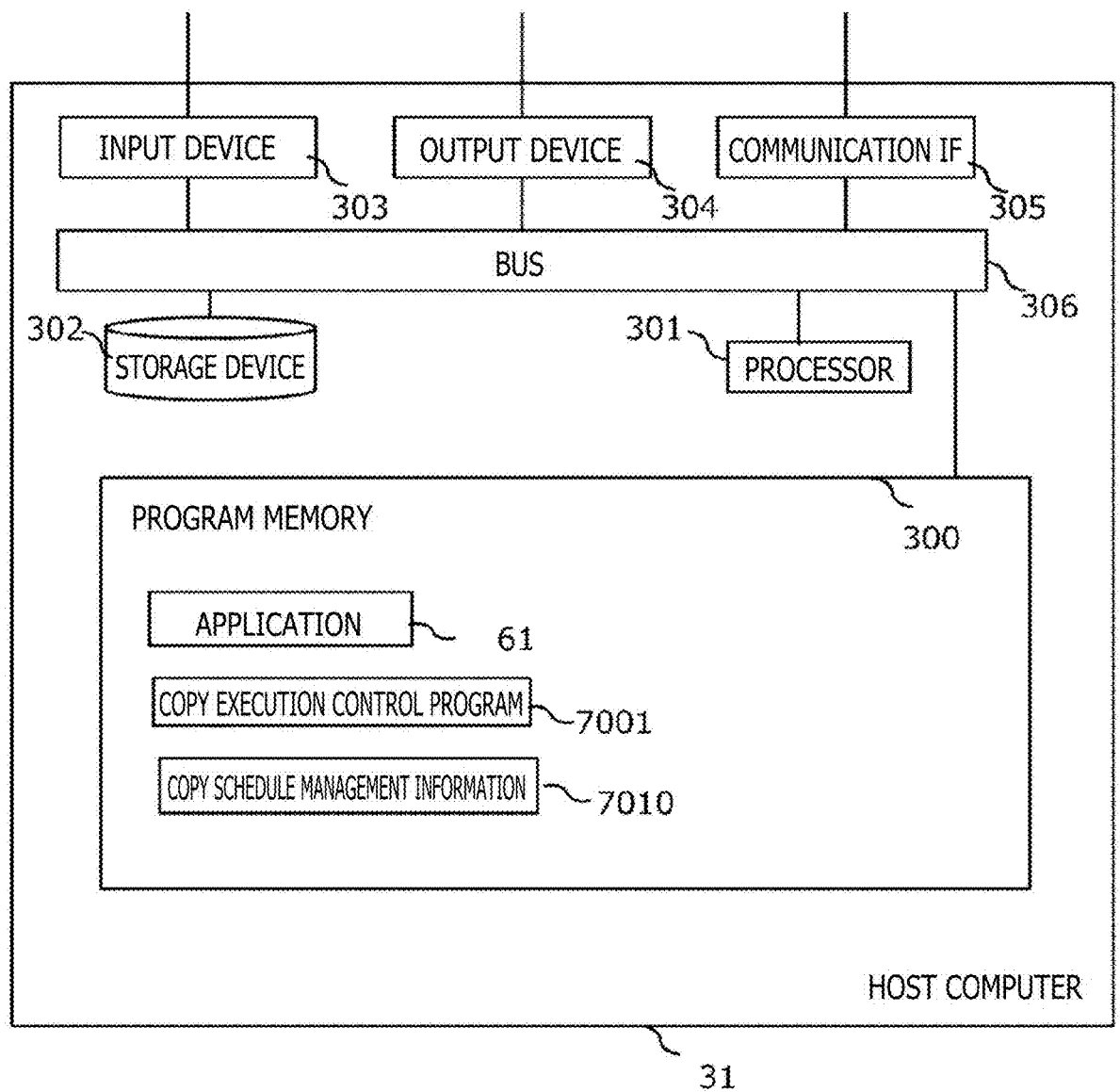
FIG. 4 is a figure depicting an example of a configuration of a host computer.

FIG. 4 is a block diagram depicting a hardware configuration example of the host computer 31. The host computer 31 has a processor 301, a storage device 302, a program memory 300, an input device 303, an output device 304, and a communication IF 305. The processor 301, the storage device 302, the program memory 300, the input device 303, the output device 304, and the communication IF 305 are connected to one another by a bus 306. The processor 301 controls the host computer 31. Data is input on the input device 303. For example, the input device 303 includes a keyboard, a mouse, a touch panel, a numeric keypad, a scanner, a microphone, and a sensor. Data is output on the output device 304. For example, the output device 304 includes a display (display apparatus), a printer, and a speaker. The communication IF 305 is connected with a network and transmits and receives data. The storage device 302 is a storage medium that stores data, and, here, uses the storage volume 41 of the storage system 4 mounted thereon. An application 61 and the copy execution control program 7001 are installed on the program memory 300. The copy execution control program 7001 is a program that transmits a copy instruction to the copy execution program 7002 on the basis of the copy schedule management information 7010. In addition, the program memory 300 has the copy schedule management information 7010 stored thereon. In a case where the storage management server 7 does not support quiescing of applications, a copy instruction is transmitted on the basis of the copy schedule management information 7010 of the host computer 31. The copy schedule management information 7010 here may be managed independently by the host computer 31.

<Various Data Structures>

Next, the data configurations of various types of data are explained using FIG. 5 to FIG. 12. Note that the configurations of the user requirement management information 5010, the application quiescing time period management information 5011, the application support information 5012, the copy procedure management information 5013, the copy required time period management information 5014, the network line use statuses 5015, the copy schedule management information 7010, the copy configuration information 7011, and the copy execution command information 7012 explained below with reference to FIG. 5 and FIG. 12 are examples and can be changed as appropriate.

FIG. 5 is a figure depicting an example of the data configuration of the user requirement management information 5010. Information input by users through the service portal 5020 is managed. The user requirement management information 5010 depicted in FIG. 5 has stored therein records including, as fields, user names 50101, application names 50102, volume IDs 50103, and amounts of data 50104, as well as, as copy requirements 50105, RTOs 50106, RPOs 50107, numbers of generations to be stored 50109, and copy destination clouds 50108.

The user names 50101 are fields that store the names of users. The application names 50102 are fields that store the names of applications developed by the users. The volume IDs 50103 are fields that store IDs to identify the storage volumes 41 and 42 in which data of the applications are stored. The amounts of data 50104 are fields that store the amounts of data used by the applications. The RTOs 50106, the RPOs 50107, the numbers of generations to be stored 50109, and the copy destination clouds 50108 which are requirements input by the users when the users perform copying are stored in the copy requirements 50105. The RTOs 50106 are fields that store RTOs of the applications designated by the users. The RPOs 50107 are fields that store RPOs of the applications designated by the users. The numbers of generations to be stored 50109 are fields that store the numbers of generations to be stored, the numbers being designated by the users. The copy destination clouds 50108 are fields that store the names of clouds designated as copy destinations by the users.

FIG. 6 is a figure depicting an example of the data configuration of the application quiescing time period management information 5011. The application quiescing time period management information 5011 depicted in FIG. 6 has fields that store application names 50111, volume IDs 50112, and quiescing time periods per unit data amount 50113.

The application names 50111 are fields that store the names of applications developed by the users. The volume IDs 50112 are fields that store IDs to identify the storage volumes 41 and 42 in which data of the applications is stored. The quiescing time periods per unit data amount 50113 are fields that store periods of time required for writing a transitory storage medium (e.g., data stored on a cache memory included in the host 31) in a non-transitory storage medium (e.g., an HDD (e.g., the storage volume 41)) of the storage system 4 when the applications are using data with a size of 1 TB, for example. The application quiescing time period calculation program 5001 monitors the storage volume 41 used by an application 61, and stores, in the quiescing time periods per unit data amount 50113, a quiescing time period per unit data amount treating, as a quiescing time period, a period of time required for writing data related to an application stored on a transitory storage medium (e.g., the cache memory included in the host 31) on a non-transitory storage medium (e.g., the HDD (e.g., the storage volume 41)) of the storage system 4.

FIG. 7 is a figure depicting an example of the data configuration of the application support information 5012. The application support information 5012 depicted in FIG. 7 has stored therein records including, as fields, management software names 50121 and supported application names 50122.

The management software names 50121 are fields that store the names of management software in the hybrid cloud system and that store the names of the hybrid cloud management server 5 and the storage management server 7. The supported application names 50122 are fields that store the names of applications quiescing of which is supported by the management software recorded in the management software names 50121.

FIG. 8 is a figure depicting an example of the data configuration of the copy procedure management information 5013. The copy procedure management information 5013 depicted in FIG. 8 has stored therein records including, as fields, application names 50131 and copy procedures 50132.

The application names 50131 store application names as fields. The copy procedures 50132 have stored therein, as fields, copy procedures to be performed when data in which the application-level consistency of a relevant application is maintained is to be copied. Copy procedures may be managed in advance for representative applications. In this example, "copy commands" are variables and may be input with reference to the copy execution command information 7012 mentioned later.

FIG. 9A is a figure depicting an example of the data configuration of the copy required time period management information 5014. The copy required time period management information 5014 depicted in FIG. 9A stores records including, as fields, copy pair IDs 50141, job IDs 50142, transfer data amounts 50143, as well as, as copy time periods 50144, copy execution instruction times 50145, copy completion times 50146, and copy required time periods 50147.

The copy pair IDs 50141 store copy pair IDs as fields. The job IDs 50142 store IDs of copy execution jobs as fields. The transfer data amounts 50143 store, as fields, the data amounts of data transferred from copy source volumes to copy destination volumes in relevant copy processes. The copy time periods 50144 store the copy execution instruction times 50145, the copy completion times 50146, and the copy required time periods 50147. The copy execution instruction times 50145 store, as fields, times at which copy commands are executed. The copy completion times 50146 store, as fields, times at which the data copying to the copy destinations has been completed. The copy required time periods 50147 store, as fields, periods of time required from the execution until the completion of the copying. The copy required time periods 50147 are values obtained by subtracting the copy execution instruction times 50145 from the copy completion times 50146. Note that fields of copy start times may be additionally managed since the copy execution instruction times and times at which the copying is started actually are different in some cases.

Copy time periods Ct depicted in FIG. 13 to be mentioned later may be determined as an average value of a plurality of copy required time periods recorded in the copy required time periods 50147 corresponding to a plurality of jobs recorded in the job IDs 50142 within a certain past period recorded in FIG. 9A.

For example, regarding copying with a copy pair ID 50141 "1," the copy time period Ct that is required when an amount of data to be transferred is 50 GB is calculated in the following manner. In a case where copy jobs within the most recent certain past period are jobs with job IDs "10001,"

"10011," and "10022," periods of time required for transferring data with a size of 50 GB are 1 minute, 2 minutes, and 3/2 minutes=1.5 minutes from values recorded in the copy required time periods 50147, and the average value thereof is calculated as (1+2+1.5)/3=1.5 minutes. Therefore, the copy time period Ct of the copying with the copy pair ID 50141 "1" at this time is 1.5 minutes.

In addition, FIG. 9B is a figure depicting an example of the data configuration of the network line use statuses 5015. The network line use statuses 5015 depicted in FIG. 9B store records including, as fields, copy pair IDs 50151, network line names 50152, times 50153, bands 50154, and use rates 50155. Note that the network line use statuses 5015 are called "network line use status information" in some cases.

In jobs represented by copy pairs recorded in the copy pair IDs 50151, data is transferred from the storage system 4 of the on-premise 1 to the storage service of the public cloud 2 through network lines 8 recorded in the network line names 50152. The bands of the network lines 8 are bands recorded in the bands 50154, and their use rates 50155 vary. The use rates 50155 of the network lines 8 are acquired periodically, and use rates acquired at times recorded in the times 50153 are recorded in the use rates 50155. The copy time periods Ct can be calculated also from the bands 50154 and the use rates 50155. For example, assume that difference data of 10 GB is to be copied using a network line "Company A, Network Line A." In a case where the entire free capacity can be used, an available band is 800×0.5=400 Mbps from values in the band 50154 and the use rate 50155. Assuming that the transfer efficiency=100% and 1 Kbyte=1000 byte, the copy time period Ct is calculated as (10 GB×1000×1000×1000×8)/(400×1000×1000)=200 seconds. Whereas use rates are depicted as an example here, for example, in a case where there are predetermined available bands in the service, the available bands for times recorded in the times 50153 may be managed as fields on the basis of use statuses.

FIG. 10 is a figure depicting an example of the data configuration of the copy schedule management information 7010. The copy schedule management information 7010 depicted in FIG. 10 stores records including, as fields, copy pair IDs 70101, periodic execution 70102, implementation timings 70103, and the numbers of generations of snapshots to be stored 70104.

The copy pair IDs 70101 store copy pair IDs as fields. The periodic execution 70102 stores, as fields, values representing ON or OFF depending on whether or not copying is executed periodically. The implementation timings 70103 store, as fields, timings at which copying is implemented. The implementation timings 70103 may store times, like "23/09/28 06:12," at which copying is to be executed next time and which are updated at any time on the basis of results of calculation of copy execution times mentioned later, or, in a case where copy execution times are calculated once at the time of introduction and the calculated times are used as copy execution intervals, the implementation timings 70103 may be recorded as "at intervals of 5 minutes" or the like. Further, in a case where copy execution times are calculated as in the description above and copies are to be acquired periodically at the same times also thereafter, times at which copying is to be executed periodically may be recorded like "06:00, 12:00." The numbers of generations of snapshots to be stored 70104 represent the numbers of generations of snapshots to be kept stored when snapshots are acquired at the time of copy data acquisition.

FIG. 11 is a figure depicting an example of the data configuration of the copy configuration information 7011. The copy configuration information 7011 depicted in FIG. 11 stores, as fields, copy pair IDs 70111, application names 70112, copy method names 70113, site names 70116 and volume IDs 70117 as copy sources 70114, and site names 70118 and volume IDs 70119 as copy destinations 70115.

The copy pair IDs 70111 store copy pair IDs as fields. The application names 70112 store application names as fields. The copy method names 70113 store, as fields, the names of methods to be used for the data copying. The copy sources 70114 store the site names 70116 and the volume IDs 70117 which are information about copy sources. The site names 70116 store, as fields, the names of sites where the storage system 4 on which copy source data is stored is installed. In addition, the volume IDs 70117 store, as fields, IDs of volumes in which copy target data is stored.

The copy destinations 70115 store the site names 70118 and the volume IDs 70119 which are information about copy destinations. The site names 70118 store, as fields, the names of sites and clouds where copy destination data is stored. In addition, the volume IDs 70119 store, as fields, IDs of volumes in which copy data is stored. Note that the copy destinations are not limited to volumes, and it is sufficient if data is recorded in units according to storage services to be used as copy destinations.

FIG. 12 is a figure depicting an example of the data configuration of the copy execution command information 7012. The copy execution command information 7012 depicted in FIG. 12 stores records including, as fields, copy method names 70121 and copy procedures 70122.

The copy method names 70121 store, as fields, the names of methods to be used for data copying. The copy procedures 70122 store, as fields, commands for executing copying which are predetermined for each copy method, such as "synchronize" or "suspend," for example.

<Copy Acquisition Interval Calculation Formula>

Figure 13:
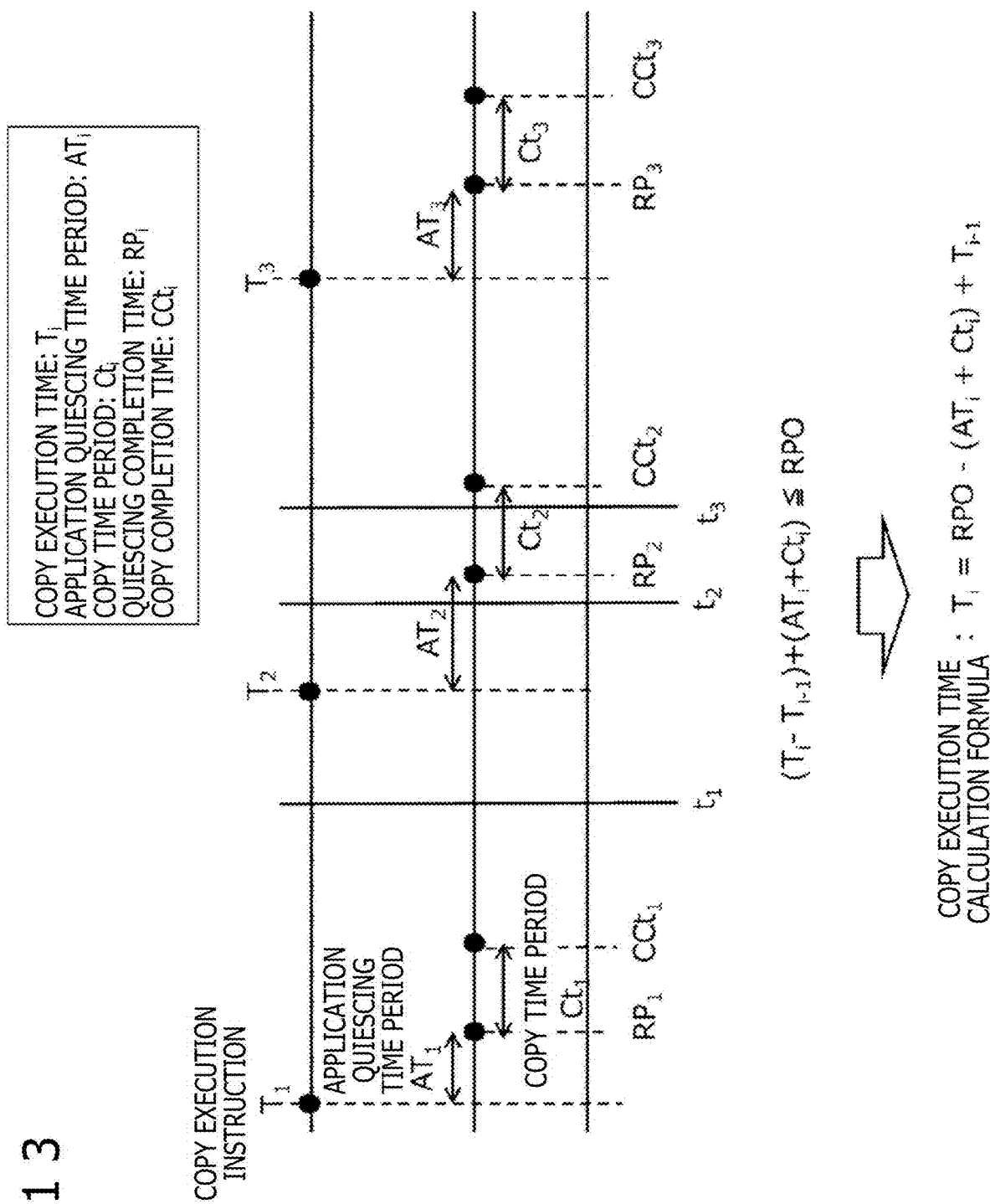
FIG. 13 is a figure depicting an example of a method for calculating a copy execution time.

FIG. 13 represents a formula for calculating a copy execution time in the copy method management program 5005 of the hybrid cloud management server 5. $T_i$ denotes a copy execution time, $AT_i$ denotes an application quiescing time period, $Ct_i$ denotes a copy time period, $RP_i$ denotes a quiescing completion time, and $CCt_i$ denotes a copy completion time. The copy execution time $T_i$ here may be a time at which a copy execution command is transmitted from the storage management server 7 to the copy function of the storage system 4. In addition, since application quiescing is started when a copy execution instruction is transmitted, the copy instruction time and the start time of the application quiescing are made the same.

In executing copying, an RPO needs to be guaranteed at any time point $t_1$. For example, the latest copy data that can be restored at $t_1$ is copy data quiesced at a time point $T_1$. Regarding $t_2$ and $t_3$ also, application quiescing and copy transfer of copying executed at $T_2$ have not been completed at $t_2$, and copy transfer of copying executed at $T_2$ has not been completed at $t_3$. Therefore, the latest copy data that can be restored at each of the two time points is data quiesced at the time point $T_1$. Conventionally, RPO is set to a copy execution interval $T_i - T_{i-1}$, but since images whose copies can be acquired are those obtained $T_i - T_{i-1}$ before or more than $T_i - T_{i-1}$ before in the examples of $t_2$ and $t_3$, the RPO is not satisfied if $T_i - T_{i-1}$ is set as the RPO. Until copying is completed at $CCt_i$, images that can be acquired are images at $T_{i-1}$ quiesced at the time of the previous copy execution instruction. That is, the sum of $T_i - T_{i-1}$, which is a copy execution instruction interval (also called a copy execution interval), the application quiescing time period $AT_i$, and the copy time period $Ct_i$ needs to be equal to or smaller than the RPO. Therefore, the copy execution interval $T_i-T_{i-1}$ needs to be equal to or smaller than RPO$-(AT_i+Ct_i)$, the copy execution time $T_i$ needs to be the same as or before RPO$-(AT_i+Ct_i)+T_{i-1}$, and the copy execution interval and the copy execution time are calculated as $T_i-T_{i-1}$=RPO$-(AT_i+Ct_i)$ and $T_i$=RPO$-(AT_i+Ct_i)+T_{i-1}$, respectively. The application quiescing time period $AT_i$ is calculated on the basis of the application quiescing time period management information 5011, and the copy time period $Ct_i$ is calculated on the basis of the copy required time period management information 5014 and the network line use statuses 5015. In a case where, for a relevant application 61, fixed values are used as the values of the application quiescing time period $AT_i$ and the copy time period $Ct_i$, copying is executed periodically with the copy execution interval $T_i-T_{i-1}$ as a constant. On the other hand, in a case where the application quiescing time period $AT_i$ and the copy time period Ct are calculated dynamically depending on the use status of the application or the network line use status, the copy execution interval $T_i-T_{i-1}$ is calculated dynamically, and the copy execution interval $T_i-T_{i-1}$ does not become a constant.

Note that the copy execution interval may be calculated as any interval that satisfies $T_i-T_{i-1}$<RPO$-(AT_i+Ct_i)$, and the copy execution time may be calculated as any time that satisfies $T_i$<RPO$-(AT_i+Ct_i)+T_{i-1}$.

<Processing Procedure>

Figure 14:
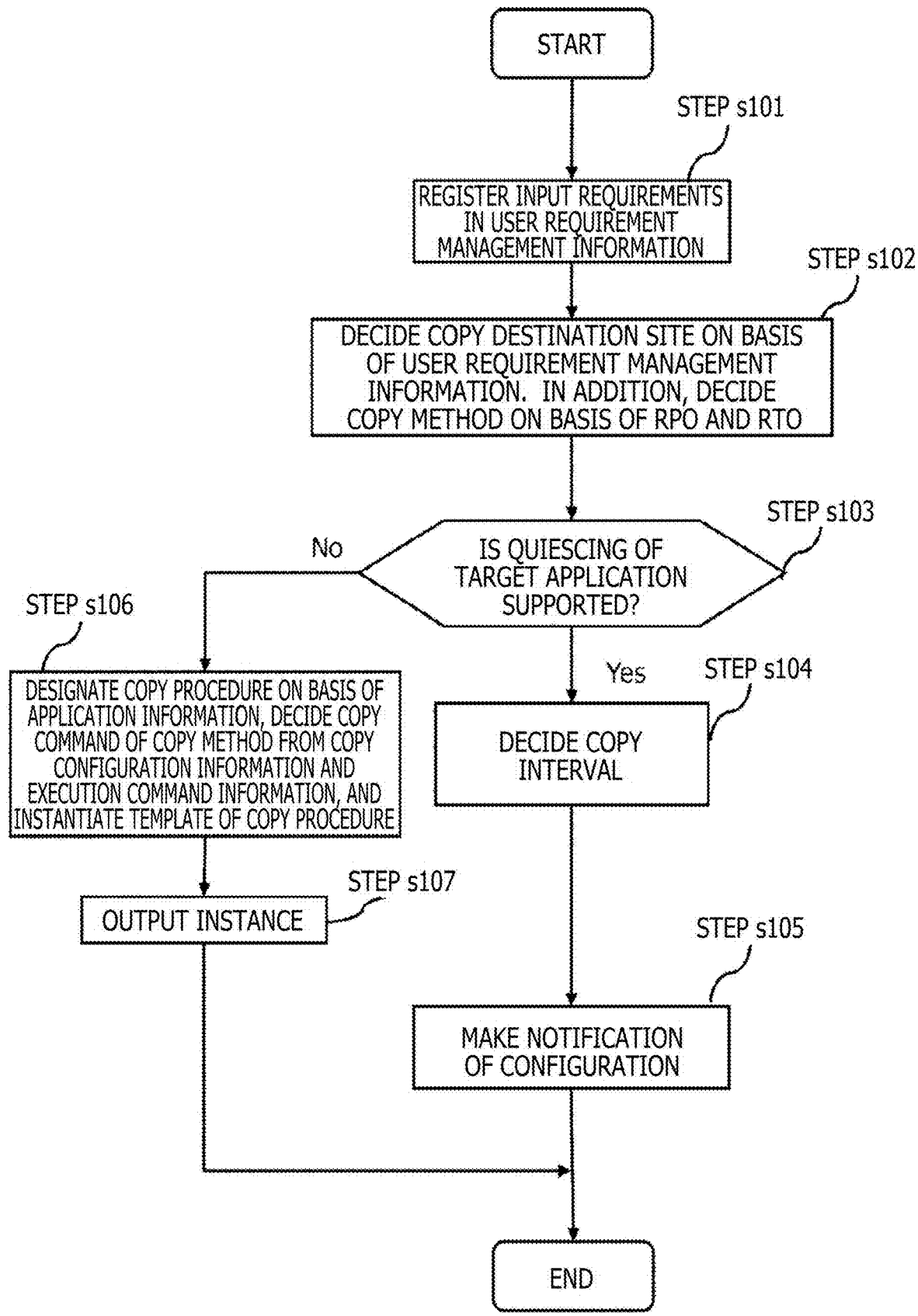
FIG. 14 is a flowchart depicting an example of a process of deciding a copy method and a copy procedure.

FIG. 14 is a flowchart depicting an example of a process of deciding a copy method and a copy procedure according to the embodiment. When a user transmits a copy environment construction request through the service portal 5020 of the hybrid cloud management server 5, the following process is started.

When the hybrid cloud management server 5 has received the copy environment construction request from the user, the input information management transfer program 5006 registers input information in the user requirement management information 5010 (Step s101). Next, the copy method management program 5005 decides a method and a configuration to be used for copying, on the basis of the user requirement management information 5010. For example, a copy destination cloud is decided from the copy destination clouds 50108. In addition, in a case where the RTO 50106 is in a certain period of time, decided is a DR configuration in which not only the storage volume 21 but also the server instance (host) 32 is prepared in the copy destination cloud. Note that the certain period of time represents a value smaller than a period of time required for newly constructing an application, and, for example, may be "zero" or "instantaneous switching" or may be written as "5 min" or the like (Step s102). The copy method management program 5005 performs a search to check if an application described in the application names 50102 of the user requirement management information 5010 is included in the application names 50122 supported in the application support information 5012 (Step s103). In a case where a result of the search at Step s103 is Yes, that is, quiescing of the application is supported at the storage management server 7, the procedure proceeds to Step s104. In a case where the result of the search at Step s103 is No, that is, quiescing of the application is not supported at the storage management server 7, the procedure proceeds to Step s106.

For example, there is a record of "App1" in the application names 50122 supported in the application support information 5012, and "VOL1" recorded in the volume IDs 50103 in the user requirement management information 5010 uses "App1" in the application names 50102. In this case, the result of the search at Step s103 is Yes. Meanwhile, "VOL2" recorded in the volume IDs 50103 in the user requirement management information 5010 uses "App2" in the application names 50102, but there is not a record of "App2" in the application names 50122 supported in the application support information 5012. In this case, the result of the search at Step s103 is No.

In the case where quiescing of the application is supported at the storage management server 7, the application quiescing time period calculation program 5001 calculates the application quiescing time period $AT_i$ on the basis of the quiescing time period per unit data amount 50113 in the application quiescing time period management information 5011 and the amount of data 50104 in the user requirement management information 5010, and the copy status monitoring program 5002 calculates the copy time period $Ct_i$ from the copy required time period 50147 in the copy required time period management information 5014. On the basis of these values, the copy method management program 5005 decides a copy execution time or a copy execution interval (copy interval) according to the calculation formula depicted in FIG. 13 (Step s104). Details of Step s104 are mentioned later with reference to FIG. 15. A copy configuration and a copy execution timing are presented to the user through the service portal 5020 of the hybrid cloud management server 5 (Step s105).

In the case where quiescing of the application is not supported at the storage management server 7, the user needs to implement, from her/his own host computer 31, processes related to copy quiescing and a copy instruction. The copy method management program 5005 searches the application names 50131 in the copy procedure management information 5013 for the application and extracts a procedure described in the relevant copy procedure 50132. In addition, a command dependent on the copy method in the copy procedures 50132 is identified by being put between double quotation marks or the like, for example. Regarding the copy method decided at Step s102, with reference to the copy procedures 70122 in the copy execution command information 7012, the relevant copy procedure 70122 is assigned between the double quotation marks in the copy procedure 50132 (Step s106). The procedure registered in Step s106 is output as a command (Step s107). At this time, a command may be output, or one including an execution environment like a virtual machine may be provided. Consequently, even in the case where quiescing of the application is not supported in the hybrid cloud, the user can execute the output command on the host computer 31 and execute the copy procedure 70122 in the copy execution command information 7012. Note that a timing at which a copy instruction is issued may be coordinated with a schedule that the user has on her/his own on the host computer 31, or a copy instruction may be issued with reference to a result of an execution timing mentioned later with reference to FIG. 15.

Figure 15:
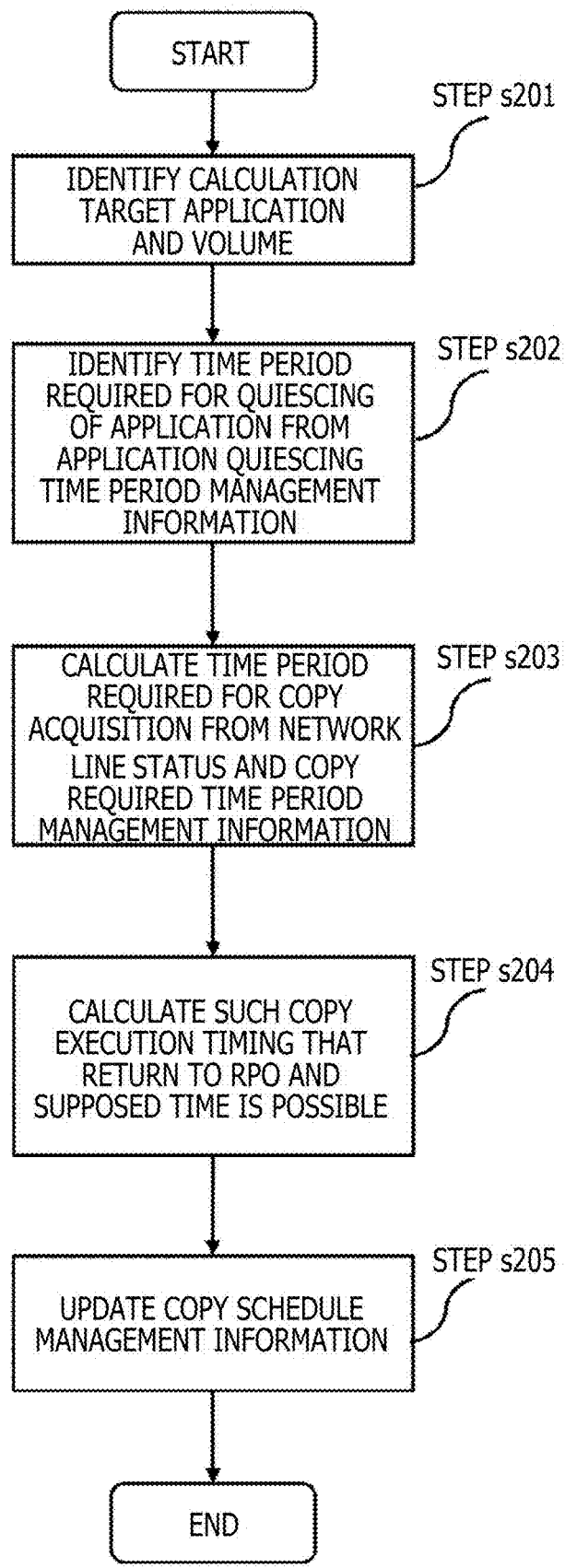
FIG. 15 is a flowchart depicting an example of a process of deciding a copy execution timing.

FIG. 15 is a flowchart depicting an example of a process of deciding a copy execution time according to the embodiment. This flowchart is for deciding the copy execution time $T_i$ and the copy execution interval $T_i-T_{i-1}$ described in FIG. 13 and depicts details of the process at Step s102 in FIG. 14. The copy execution time $T_i$ is calculated from the RPO, the application quiescing time period $AT_i$, and the copy time period $Ct_i$. Values of the application quiescing time period $AT_i$ and the copy time period $Ct_i$ used are those at a certain time point, and, in a case where this calculation process is implemented only once at the time of the start of copying, the copying is executed periodically with the copy execution interval $T_i-T_{i-1}$ as a constant. On the other hand, since, in a case where this calculation process is executed multiple times periodically, values of the application quiescing time period $AT_i$ and the copy time period $Ct_i$ used are those at the time point of calculation, the copy execution interval $T_i-T_{i-1}$ is not constant, and the value of the copy execution time $T_i$ which is optimum at that time point is calculated.

The copy method management program 5005 identifies a calculation target application and volume from the application names 50102 and the volume IDs 50103 in the user requirement management information 5010 (Step s201). The application quiescing time period calculation program 5001 calculates the application quiescing time period $AT_i$ on the basis of the quiescing time periods per unit data amount 50113 in the application quiescing time period management information 5011 and the amounts of data 50104 in the user requirement management information 5010 (Step s202). The copy status monitoring program 5002 calculates the copy time period $Ct_i$ from the copy required time periods 50147 in the copy required time period management information 5014 (Step s203). As the copy required time period, the copy required time periods 50147 in the copy required time period management information 5014 may be referred to, or the copy time period $Ct_i$ for a transfer data amount may be predicted taking into consideration a network line congestion status monitored by the copy line monitoring program 5003. The results obtained at Step s202 and Step s203 and the value of the RPO recorded in the RPOs 50107 stored in the user requirement management information 5010 are input to the calculation formula depicted in FIG. 13 to calculate the copy execution interval $T_i-T_{i-1}$ or the copy execution time $T_i$ (Step s204). For example, the copy execution time $T_i$ is calculated by calculating the current copy execution interval $T_i-T_{i-1}$ by subtracting the total length of time of the current application quiescing time period $AT_i$ and the current copy time period $Ct_i$ from the RPO, and then adding the current copy execution interval $T_i-T_{i-1}$ to the previous copy execution time $T_{i-1}$. For example, the copy execution interval $T_i-T_{i-1}$ is calculated by subtracting the total length of time of the current application quiescing time period $AT_i$ and the current copy time period $Ct_i$ from the RPO. Note that $T_i$ may be calculated dynamically by using the calculation formula depicted in FIG. 13. That is, using the calculation formula depicted in FIG. 13, the copy execution time $T_i$ may be calculated as a timing of a copy execution instruction for data copying, every time data copying is executed. In addition, this calculation process may be implemented only once at the time of the start of copying, the calculated copy execution interval $T_i-T_{i-1}$ may be fixed as a constant, and timings at which periodic copying is executed may be calculated. That is, when copying is to be executed, the copy execution interval $T_i-T_{i-1}$ may be calculated, and timings of copy execution instructions for the subsequent periodic copying may be calculated on the basis of the current copy execution time $T_i$ and the data copying execution interval $T_i-T_{i-1}$ (constant (fixed value)) having already been calculated. On the basis of the result calculated at step s204, the copy method management program 5005 updates the copy schedule management information 7010 and transmits the updated contents also to the storage management server 7 (Step s205).

<Service Portal Display Screen>

FIG. 16 is a figure depicting an example of output display of the service portal (service portal screen) 5020, and depicts an example of a screen on which a user inputs copy requirements, as an example of an input screen. The user inputs a volume name, an application name, an RPO, an RTO, a copy destination cloud, and a number of generations of snapshots to be stored, which are managed in the user requirement management information 5010. For example, using drill-down, the user is allowed to select the volume name from volumes having already been used by the user. In addition, the user is also allowed to select the copy destination cloud from target clouds of the hybrid cloud. In addition, whereas the number of snapshots to be stored is written here as an example, in a case where ranges of the RPO and the RTO that can be guaranteed are predetermined as the system, selection can be made on the interface only within the ranges.

As an example of an output screen, depicted is an output example in a case where an application 61 being used is not supported by the hybrid cloud system and copying is to be executed using a schedule of the host computer 31 of the user (an output example of Step s107 in FIG. 14). A script in which a copy procedure is described may be output in a state where a copy configuration is presented. The user may download the script and execute the script on her/his own host computer 31.

As explained above, according to the embodiment, copy operation satisfying application-level copy requirements can be assisted. Further, according to the embodiment, copy operation satisfying application-level copy requirements can be assisted by dynamically deciding copy execution times taking into consideration also application use statuses and network line use statuses.

Note that the present invention is not limited to the embodiment described above and includes various modification examples. In addition, for example, constituent elements are explained in detail in the embodiment described above in order to explain the present invention in an easy-to-understand manner, and the present invention is not necessarily limited to the embodiment including all the constituent elements explained. In addition, some of constituent elements of each embodiment can be added to other constituent elements, deleted, or replaced with other constituent elements.

In addition, some or all of respective constituent elements, functions, processing sections, processing means, or the like described above may be realized by hardware by designing them on an integrated circuit and so on, for example. In addition, the present invention can also be realized by software program codes that realize functions of the embodiment. In this case, a storage medium on which the program codes are recorded is provided to a computer, and a processor included in the computer reads out the program codes stored on the storage medium. In this case, the program codes themselves read out from the storage medium realize the functions of the embodiment mentioned before, and the program codes themselves and the storage medium on which the program codes are stored are included in the present invention. As the storage medium for supplying such program codes, for example, a flexible disc, a CD-ROM, a DVD-ROM, a hard disk, an SSD, an optical disc, a magneto-optical disc, a CD-R, a magnetic tape, a non-volatile memory card, a ROM, or the like is used.

In addition, the program codes that realize the functions described in the present embodiment can be implemented by a wide range of program or script languages such as assemblers, C/C++, perl, Shell, PHP, Python, or Java (registered trademark), for example.

Furthermore, software program codes that realize the functions of the embodiment may be distributed via a network and stored on storage means such as a hard disk or a memory of a computer or a storage medium such as a CD-RW or a CD-R, and a processor included in the computer may read out and execute the program codes stored on the storage means or the storage medium.

In the embodiment mentioned above, depicted control lines and information lines are ones that are considered to be necessary for explanation, and all control lines and information lines that are necessary for products are not necessarily depicted. All constituent elements may be connected mutually.

What is claimed is:

1. A system managing apparatus comprising:
an information processing apparatus that has a processor and that manages a hybrid cloud system that includes a computer system including a first storage constructed in an on-premises environment and a second storage constructed in a cloud environment, the hybrid cloud system being configured to data copying by which a copy of data of an application stored on the first storage is stored on the second storage,
wherein the information processing apparatus is configured to:
acquire a recovery point objective, an application quiescing time period per unit data amount, a copy data amount, and a copy time period regarding the data copying of the application,
calculate a timing of a copy execution instruction for the data copying that guarantees the recovery point objective that maintains consistency of the application, on a basis of the recovery point objective, the application quiescing time period per unit data amount, the copy data amount, and the copy time period, and
executing the copy execution instruction based on the calculated timing that guarantees the recovery point objective to guarantee consistency of the application.

2. The system managing apparatus according to claim 1, wherein the information processing apparatus is configured to calculate the timing of the copy execution instruction for the data copying every time the data copying is executed.

3. The system managing apparatus according to claim 2, wherein the information processing apparatus is configured to:
calculate an execution interval of the data copying on the basis of the recovery point objective, the application quiescing time period per unit data amount, the copy data amount, and the copy time period, and
calculate the timing of the copy execution instruction for the data copying every time the data copying is executed, by calculating, as the timing of the copy execution instruction for the data copying, a current execution time of the data copying on a basis of a previous execution time of the data copying and the execution interval of the data copying.

4. The system managing apparatus according to claim 3, wherein the information processing apparatus is configured to;
calculate a current application quiescing time period on a basis of the application quiescing time period per unit data amount and the copy data amount,
calculate the execution interval of the data copying by subtracting a total length of time of the current application quiescing time period and the copy time period from the recovery point objective, and
calculate, as the timing of the copy execution instruction for the data copying, a time which is a sum of the previous execution time of the data copying and the execution interval of the data copying.

5. The system managing apparatus according to claim 1, wherein the information processing apparatus is configured to calculate a current timing of the copy execution instruction for the data copying and subsequent timings of the copy execution instruction for the data copying when the data copying is executed.

6. The system managing apparatus according to claim 5, wherein the information processing apparatus is configured to:
calculate an execution interval of the data copying when the data copying is executed, and
calculate subsequent periodic timings of the copy execution instruction for the data copying on a basis of a current execution time of the data copying and the execution interval of the data copying having already been calculated.

7. The system managing apparatus according to claim 6, wherein the information processing apparatus is configured to:
calculate a current application quiescing time period on a basis of the application quiescing time period per unit data amount and the copy data amount, and
calculate the execution interval of the data copying by subtracting a total length of time of the current application quiescing time period and the current copy time period from the recovery point objective.

8. The system managing apparatus according to claim 1, further comprising:
a storage apparatus that stores user requirement management information including information related to the recovery point objective and the copy data amount of the application, application quiescing time period management information including information for calculating the application quiescing time period, and copy required time period management information including a past history of periods of time required for the data copying,
wherein the information processing apparatus is configured to:
acquire the copy data amount and the recovery point objective on a basis of the user requirement management information,
acquire the application quiescing time period per unit data amount on a basis of the application quiescing time period management information, and
acquire the copy time period on a basis of the copy required time period management information.

9. The system managing apparatus according to claim 8, wherein the storage apparatus stores network line use status information related to a network line use status, and
wherein the information processing apparatus is configured to:
acquire availability of a network line band between the on-premises environment and the cloud environment on a basis of the network line use status information in a case where the copy time period cannot be acquired before operation of the data copying, and
acquire the copy time period by calculating the copy time period on a basis of the availability of the network line band and the copy data amount.

10. The system managing apparatus according to claim 8, wherein the computer system includes a host computer to which a copy target volume including target data of the data copying is provided from the first storage, the host computer having a cache memory that caches data, and
wherein the information processing apparatus is configured to;
monitor the copy target volume, and store, as the application quiescing time period per unit data amount and in the application quiescing time period management information, a period of time required for writing in the volume from the cache memory per unit data amount in a case where the data copying of the application is executed.

11. The system managing apparatus according to claim 10, wherein the user requirement management information includes information representing a recovery time objective and a copy destination cloud related to the data copying of the application, and
wherein the information processing apparatus is configured to decide a copy configuration including a copy method and a copy destination cloud, on a basis of the user requirement management information.

12. The system managing apparatus according to claim 11, wherein the information processing apparatus is configured to determine whether or not the recovery time objective is within a predetermined period of time, and
wherein, in a case where the recovery time objective is within the predetermined period of time, decide a disaster recovery configuration in which a server instance corresponding to the host computer is prepared in the cloud environment including a copy destination storage.

13. The system managing apparatus according to claim 1, further comprising:
a display apparatus that can display an image; and
a storage apparatus on which copy procedure management information related to a copy procedure of the application is stored,
wherein the first storage includes a storage management server that manages the first storage, and
wherein the information processing apparatus is configured to:
determine whether or not the storage management server supports quiescing of the application,
calculate the timing of the copy execution instruction for the data copying in a case where the storage management server supports quiescing of the application, and
display, on the display apparatus, information representing a data copying procedure, on a basis of the copy procedure management information, in a case where the storage management server does not support quiescing of the application.

14. The system managing apparatus according to claim 13, wherein the storage management server has a storage apparatus on which copy execution command information related to a copy procedure command for each copy method is stored, and
wherein the information processing apparatus is configured to create the data copying procedure by citing, in the data copying procedure, a command which is different for each copy method from the copy execution command information.

15. A system management method implemented an information processing apparatus that manages a hybrid cloud system that includes a computer system including a first storage constructed in an on-premises environment and a second storage constructed in a cloud environment, the hybrid cloud system being configured to practically apply data copying by which a copy of data of an application stored on the first storage is stored on the second storage to guarantee consistency of the application, the system management method comprising:
acquiring a recovery point objective, an application quiescing time period per unit data amount, a copy data amount, and a copy time period regarding the data copying of the application,
calculating a timing of a copy execution instruction for the data copying that guarantees the recovery point objective that maintains consistency of the application, on a basis of the recovery point objective, the application quiescing time period per unit data amount, the copy data amount, and the copy time period, and
executing the copy execution instruction based on the calculated timing that guarantees the recovery point objective to guarantee consistency of the application.

16. The system management method to claim 15, wherein the information processing apparatus is configured to calculate the timing of the copy execution instruction for the data copying every time the data copying is executed.

17. The system management method according to claim 16, further comprising:
calculating an execution interval of the data copying on the basis of the recovery point objective, the application quiescing time period per unit data amount, the copy data amount, and the copy time period, and
calculating the timing of the copy execution instruction for the data copying every time the data copying is executed, by calculating, as the timing of the copy execution instruction for the data copying, a current execution time of the data copying on a basis of a previous execution time of the data copying and the execution interval of the data copying.

18. The system management method according to claim 17, further comprising:
calculating a current application quiescing time period on a basis of the application quiescing time period per unit data amount and the copy data amount,
calculating the execution interval of the data copying by subtracting a total length of time of the current application quiescing time period and the copy time period from the recovery point objective, and
calculating, as the timing of the copy execution instruction for the data copying, a time which is a sum of the previous execution time of the data copying and the execution interval of the data copying.

19. The system management method according to claim 15, wherein the information processing apparatus is configured to calculate a current timing of the copy execution instruction for the data copying and subsequent timings of the copy execution instruction for the data copying when the data copying is executed.

20. The system managing method according to claim 19, further comprising:
calculating an execution interval of the data copying when the data copying is executed, and
calculating subsequent periodic timings of the copy execution instruction for the data copying on a basis of a current execution time of the data copying and the execution interval of the data copying having already been calculated.

* * * * *